United States Patent
Huang

(10) Patent No.: US 10,249,458 B2
(45) Date of Patent: Apr. 2, 2019

(54) ELECTRICAL SEAL

(71) Applicant: Chicony Power Technology Co., Ltd., New Taipei (TW)

(72) Inventor: Chao-Sheng Huang, New Taipei (TW)

(73) Assignee: CHICONY POWER TECHNOLOGY CO., LTD., New Taipei (TW)

(*) Notice: Subject to any disclaimer, the term of this patent is extended or adjusted under 35 U.S.C. 154(b) by 0 days.

(21) Appl. No.: 15/861,694

(22) Filed: Jan. 4, 2018

(65) Prior Publication Data

US 2019/0043678 A1   Feb. 7, 2019

Related U.S. Application Data

(60) Provisional application No. 62/539,556, filed on Aug. 1, 2017.

(30) Foreign Application Priority Data

Oct. 31, 2017   (TW) .............................. 106137652 A

(51) Int. Cl.
| | | |
|---|---|---|
| G06F 21/45 | (2013.01) | |
| G06K 19/063 | (2006.01) | |
| H01H 13/86 | (2006.01) | |
| H01H 13/14 | (2006.01) | |
| H01H 36/00 | (2006.01) | |

(52) U.S. Cl.
CPC ............. *H01H 13/86* (2013.01); *G06F 21/45* (2013.01); *G06K 19/063* (2013.01); *H01H 13/14* (2013.01); *H01H 36/00* (2013.01); *H01H 2036/0086* (2013.01)

(58) Field of Classification Search
CPC ............................ G06K 19/063; G06F 21/45
See application file for complete search history.

(56) References Cited

U.S. PATENT DOCUMENTS

| | | | | |
|---|---|---|---|---|
| 5,559,665 | A * | 9/1996 | Taranowski | H03K 17/975 361/280 |
| 2010/0009658 | A1* | 1/2010 | Wu | H04M 1/673 455/411 |
| 2013/0194202 | A1* | 8/2013 | Moberg | G06F 3/044 345/173 |
| 2014/0354594 | A1* | 12/2014 | Kreutzer | G06F 3/044 345/174 |
| 2015/0293622 | A1 | 10/2015 | Han et al. | |

(Continued)

FOREIGN PATENT DOCUMENTS

| | | |
|---|---|---|
| CN | 102906676 A | 1/2013 |
| CN | 203812269 U | 9/2014 |

(Continued)

*Primary Examiner* — Adrian S Wilson
(74) *Attorney, Agent, or Firm* — CKC & Partners Co., LLC

(57) ABSTRACT

An electronic seal includes a housing, a cover, at least one touch piece, and, a transmission mechanism. The housing has at least one through track, in which the through track is disposed on the bottom of the housing. The cover is disposed on the housing and covers the housing. The touch piece is movably disposed on the through track and is partially exposed out of the housing. The transmission mechanism includes a driving member, in which the driving member drives the touch piece to move along the through track when the driving member is actuated relative to the housing.

22 Claims, 10 Drawing Sheets

(56) References Cited

U.S. PATENT DOCUMENTS

| | | | |
|---|---|---|---|
| 2015/0355750 A1 | 12/2015 | Han et al. | |
| 2016/0001180 A1* | 1/2016 | Shi | G06F 3/0487 463/32 |
| 2016/0062480 A1* | 3/2016 | Ogawa | G06F 3/033 345/156 |
| 2018/0150144 A1* | 5/2018 | Kirita | G06F 3/038 |

FOREIGN PATENT DOCUMENTS

| | | |
|---|---|---|
| CN | 104220977 A | 12/2014 |
| CN | 104854595 A | 8/2015 |
| CN | 204977862 U | 1/2016 |
| CN | 103309613 B | 3/2016 |
| CN | 206012052 U | 3/2017 |
| JP | 2015191629 A | 11/2015 |
| TW | 201530363 A | 8/2015 |
| TW | M535346 U | 1/2017 |
| WO | 2016181539 A1 | 11/2016 |

\* cited by examiner

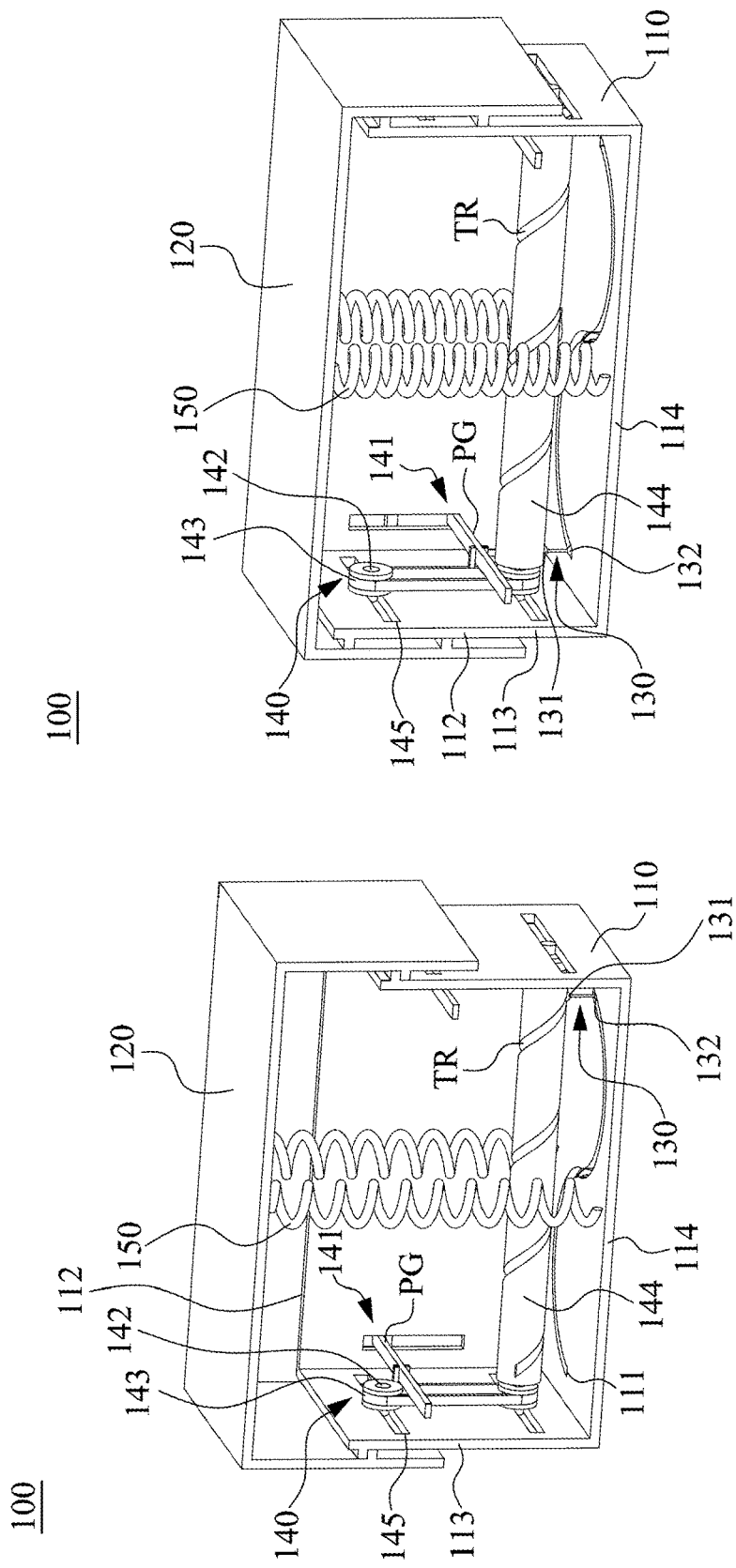

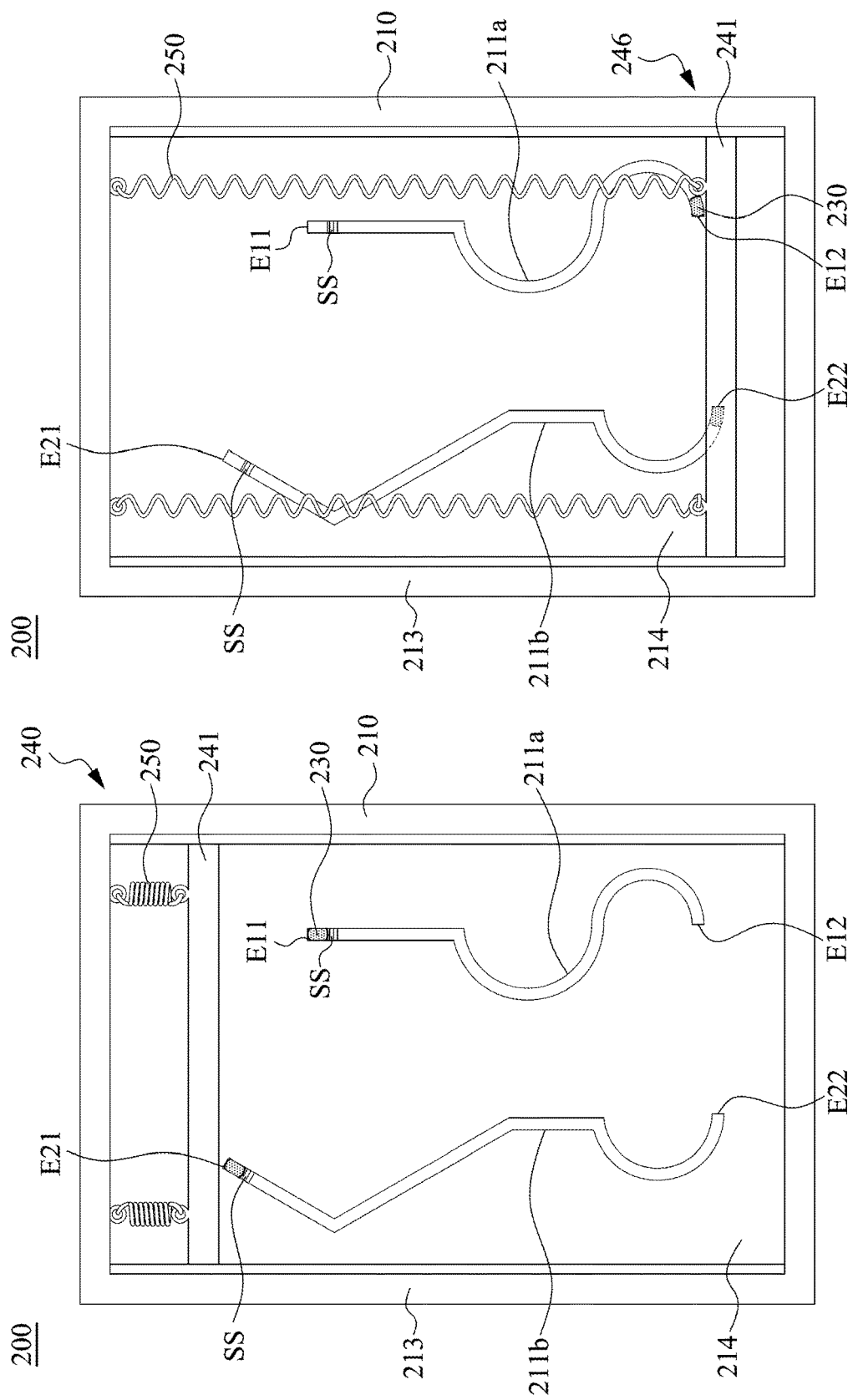

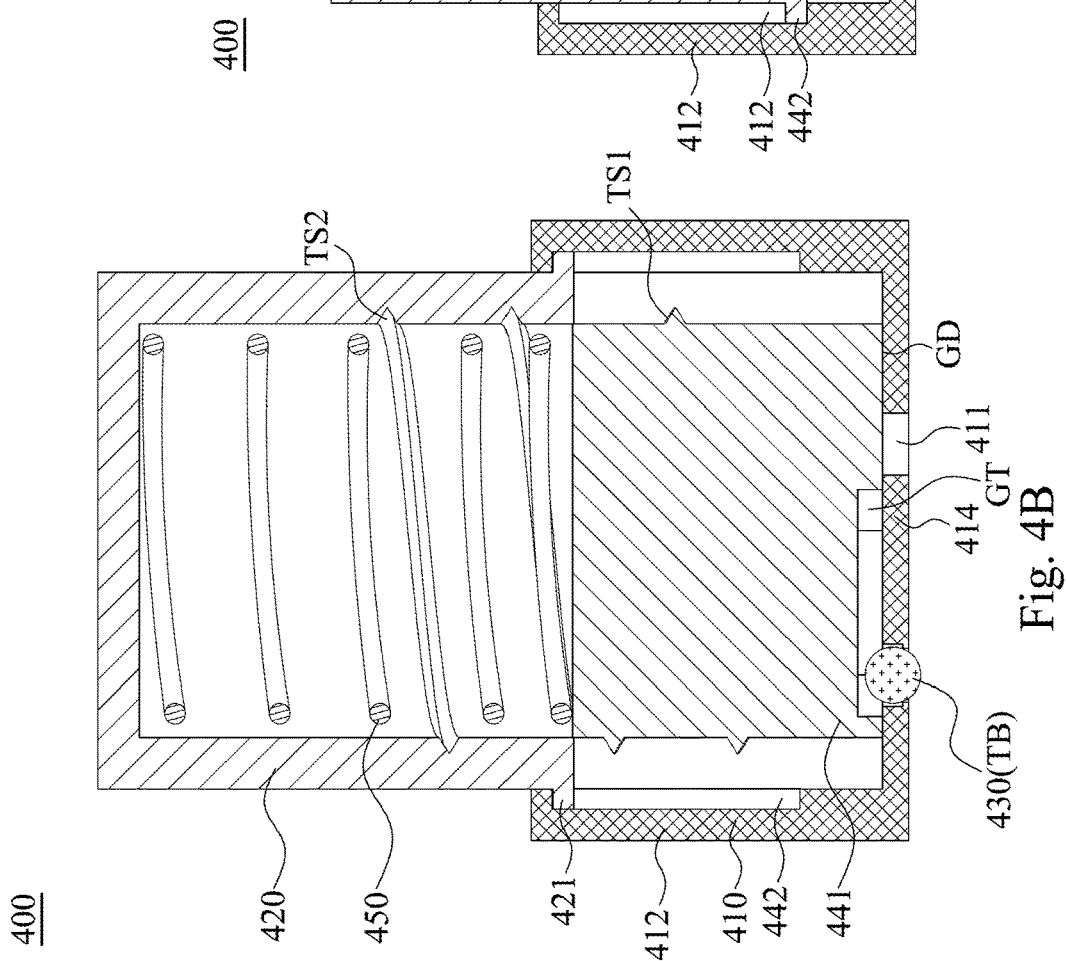

ELECTRICAL SEAL

CROSS-REFERENCE TO RELATED APPLICATION

This application claims priority to U.S. Provisional Application Ser. No. 62/539,556 filed Aug. 1, 2017, and Taiwan Application Serial Number 106137652, filed Oct. 31, 2017, the disclosures of which are incorporated herein by reference in their entireties.

BACKGROUND

Technical Field

The present disclosure relates to an electronic seal.

Description of Related Art

Nowadays, the wide application of smartphone had brought to the development of capacitive touch screen. Comparing to resistant touch screen, capacitive touch screen wound not affect the image quality while the accumulated electrostatic capacitance in human body may be utilized to provide precise input through finger touching, so as to form a certification approach by using the fingerprint recognition. However, the foregoing fingerprint certification approach is personal, which excludes the certification function similar to the recognition tool, so it's not convenient for certification usage in public regions. On the other hand, traditional seals which print ink paste onto papers lack the digitalization concept, so that it cannot react to the demand of intelligence digitalization.

Therefore, how to achieve an electronic certification approach that can be conveniently used in public regions is a crucial issue in the industry.

SUMMARY

The present disclosure relates to an electronic seal having specificity and convenience in electronic certification.

In an embodiment of the disclosure, the electronic seal applied for the touch device includes a housing, a cover, at least one touch piece, and a transmission mechanism. The housing has at least one through track. The at least one through track is disposed on the bottom of the housing. The cover is disposed on and covers the housing. The at least one touch piece is movably disposed on the at least one through track and partially exposed out of the housing. The transmission mechanism includes a driving member. The driving member drives the at least one touch piece to move along the at least one through track when the driving member is actuated relative to the housing.

In some embodiments of the present disclosure, the housing includes a first sidewall, a second sidewall, and a base. The second sidewall is connected to the first sidewall. The base is located at the bottom of the housing and is connected to the first sidewall and the second sidewall. The at least one through track is located on the base. The cover is movably sleeved on the housing.

In some embodiments of the present disclosure, the first sidewall has a through hole. The transmission mechanism further includes a rotating shaft, a belt, and a threaded shaft. The rotating shaft is rotatably disposed on the second sidewall. The belt surrounds and contacts the outer edge of the rotating shaft and is configured to drive the rotating shaft to rotate. The threaded shaft is connected to the rotating shaft. The driving member of the transmission mechanism includes a bolt connected to the cover. The bolt penetrates into the housing through the through hole and is connected to the belt. When the driving member moves relative to the housing, the bolt drives the belt to rotate the rotating shaft, and the rotating shaft rotate the threaded shaft.

In some embodiments of the present disclosure, the threaded shaft has a threaded slide rail. The at least one touch piece includes a first ball and a second ball. The first ball and the second ball are connected to each other. The first ball is slidably engaged with the threaded slide rail of the threaded shaft. The second ball is slidably engaged with the through track.

In some embodiments of the present disclosure, the transmission mechanism further includes a guiding structure located on the second sidewall. The rotating shaft of the transmission mechanism moves along the guiding structure.

In some embodiments of the present disclosure, the electronic seal further includes a position-recovery member connected to the housing and the cover.

In some embodiments of the present disclosure, the at least one through track has a first end and an engaging structure adjacent to the first end. The engaging structure is configured to detachably engage the at least one touch piece to the first end.

In some embodiments of the present disclosure, the number of the foregoing through track is plural. Shortest distances respectively from the first ends of the through tracks to the first sidewall are not equal.

In some embodiments of the present disclosure, the transmission mechanism further includes a guiding structure located on the second sidewall. The driving member is slidably engaged onto the guiding structure.

In some embodiments of the present disclosure, the numbers of the at least one touch piece and the at least one through track are plural. The touch pieces and the driving member are magnetic. The driving member attracts and drives each of the touch pieces to move along a corresponding one of the through tracks when the driving member moves relative to the housing In some embodiments of the present disclosure, the electronic seal further includes a position-recovery member connected to the housing and the driving member.

In some embodiments of the present disclosure, the cover has an opening groove substantially extending along a direction parallel to the second sidewall.

In some embodiments of the present disclosure, the number of the at least one through track is two. A number of the at least one touch piece is also two.

In some embodiments of the present disclosure, the electronic seal further includes a second track. The at least one through track has a plurality of turning portions. The second track has a plurality of through portions. Corners of the turning portions of the at least one through track are respectively aligned with the through portions of the second track.

In some embodiments of the present disclosure, the housing includes a sidewall. The at least one through track is located on the base. The cover is movably sleeved onto the housing.

In some embodiments of the present disclosure, the transmission mechanism further includes a guiding structure located on the sidewall of the housing and extending toward two ends of the sidewall. The cover has a bump located on an outer surface of the cover. The bump of the cover is slidably engaged with the guiding structure.

In some embodiments of the present disclosure, the cover is sleeved between the housing and the driving member, and the driving member is a cylindrical structure. The driving member includes a guiding disk, a guiding groove, and a cylindrical outer surface. The guiding disk abuts against the base of the housing. The guiding groove is located on the guiding disk. The cylindrical outer surface is connected to the guiding disk and has a first threaded structure.

In some embodiments of the present disclosure, the cover has a second threaded structure located on an inner surface of the cover. The second threaded structure and the first threaded structure of the cylindrical outer surface of the driving member are screwed together.

In some embodiments of the present disclosure, the at least one touch piece includes a tracking ball slidably disposed in the at least one through track. The tracking ball is partially protruded out of the at least one through track and is slidably engaged to the guiding groove of the driving member. The guiding groove pushes the tracking ball to move from an end to another end of the at least one through track when the driving member rotates relative to the housing.

In some embodiments of the present disclosure, the electronic seal further includes a position-recovery member connected to the driving member and the cover.

In some embodiments of the present disclosure, the profile of the foregoing guiding groove is strip-shaped. The tracking ball forms a specific track on the touch device.

In some embodiments of the present disclosure, the profile of the foregoing specific track is arc-shaped.

As mentioned above, in the embodiment of the present disclosure, through the configuration of the touch piece, the driving member, and the through track, the electronic seal can drive the touch piece to move along the corresponding through track and forms a specific track on the touch device when the driving member moves relative to the housing. In addition, the touch device on which the specific track is formed by the electronic seal can recognize whether the specific track matches the build-in default track, and decide whether to provide a specific service for users. Therefore, the electronic seal of the present embodiment may be easily applied for electrical certification in public regions and can provide specificity and convenience.

BRIEF DESCRIPTION OF THE DRAWINGS

FIGS. 1B and 1C show perspective cross-sectional views of the electronic seal in FIG. 1A in different operation steps;

FIGS. 2B and 2C show schematic diagrams of the electronic seal in FIG. 2A in different operation steps;

FIGS. 4B and 4C show schematic diagrams of the electronic seal in FIG. 4A in different operation steps.

DETAILED DESCRIPTION

Figure 1A:
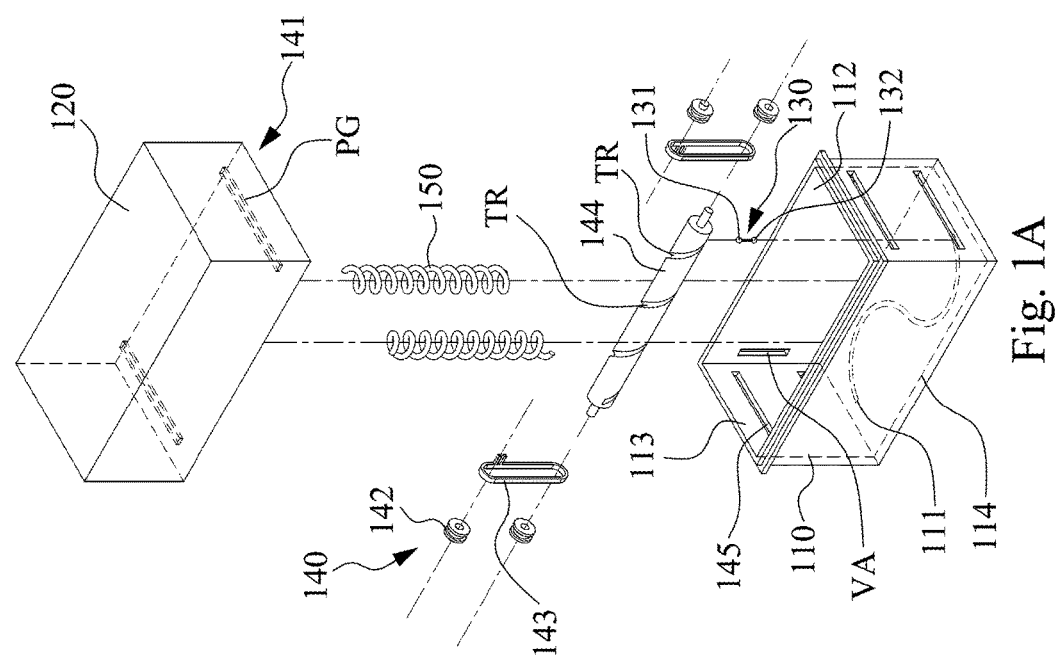
FIG. 1A shows an exploded view of an electronic seal according to an embodiment of the disclosure.

Reference is made to FIG. 1A. FIG. 1A shows an exploded view of an electronic seal 100 according to an embodiment of the disclosure. FIGS. 1B and 1C show perspective cross-sectional views of the electronic seal 100 in FIG. 1A in different operation steps. As shown in FIG. 1A, in the present embodiment, the electronic seal 100 may be applied to a touch device (not shown). The electronic seal 100 includes the housing 110, a cover 120, at least one touch piece 130, a transmission mechanism 140, and a position-recovery member 150. Specifically, as shown in FIG. 1A, in the present embodiment, the housing 110 has at least one through track 111. The at least one through track 111 is located on the bottom of the housing. At least one touch piece 130 is movably disposed on the at least one through track 111 and partially exposed out of the housing 110. Each touch piece 130 contacts to the touch device through the at least one through track 111.

Further, in the present embodiment, the transmission mechanism 140 includes a driving member 141. The driving member 141 drives the at least one touch piece 130 to move along the at least one through track 111 when the driving member 141 is actuated relative to the housing 110. In this way, each touch piece 130 forms a specific track on the touch device so as to perform certification. For example, as shown in FIGS. 1B and 1C, in the present embodiment, the driving member 141 includes a bolt PG disposed on the cover 120. The at least one touch piece 130 includes a first ball 131 and a second ball 132. When the bolt of the driving member 141 is actuated by the external force accepted, the bolt will drives the first ball 131 and the second ball 132 to move along the at least one through track 111, so as to from specific tracks, but the present disclosure is not limited in this regard. In other embodiments, the driving member 141 may include other members configured to directly or indirectly accept external force so as to drive the touch piece 130, and the at least one touch piece 130 may also be a tracking ball or other structure which is suitable for forming a specific track on the touch device. In other words, the driving member 141 and the touch piece 130 are defined such that as long as the driving member 141 may be configured to directly or indirectly accept external force to drive the touch piece 130 to form the specific track.

There will be detailed description accompanied with the FIGS. 1B to 1C for the respect of the process of forming specific through track of each touch piece 130.

As shown in FIGS. 1B and 1C, in the present embodiment, the cover 120 is disposed on the housing 110 and covers the housing 110. Specifically, in the present embodiment, the housing 110 includes a first sidewall 112, a second sidewall 113, and a base 114. The second sidewall 113 is connected to the first sidewall 112. The base 114 is disposed at the bottom of the housing 110 and is connected to the first sidewall 112 and the second sidewall 113. The at least one through track 111 is disposed on the base 114. The cover 120 is movably mounted onto the housing. Further, as shown in FIGS. 1B and 1C, in the present embodiment, the position-recovery member 150 is connected to the housing 110 and the cover 120.

More specifically, as shown in FIGS. 1B and 1C, in the present embodiment, the first sidewall 112 of the cover 110 has a through hole VA. The transmission mechanism 140 further includes a rotating shaft 142, a belt 143, a threaded shaft 144, and a guiding structure 145. In the present embodiment, the threaded shaft 144 is connected to the rotating shaft 142. The rotating shaft 142 is rotatably disposed on the second sidewall 113. The belt 143 surrounds and contacts the outer surface of the rotating shaft 142, and is configured to rotate the rotating shaft 142. Furthermore, in the present embodiment, the guiding structure 145 is also located on the second sidewall 133, and the rotating shaft 142 of the transmission mechanism 140 can move along the guiding structure 145. For example, in the present embodiment, the guiding structure 145 may be the guiding through hole VA or a guiding rail, but the present disclosure is not limited in this regard.

In addition, for example, as shown in FIGS. 1B and 1C, the source of the external force may be from hands or external elements which make the cover 120 to move relative to the position of the cover 120. In this way, the driving member 141, such as the bolt PG disposed on the cover 120, can accepts external force through the cover 120 to move relative to the housing 110 to drive the related members, and further make the touch piece 130 move along the at least one through track 111, so as to form the specific track on the touch device.

For example, as shown in FIGS. 1B and 1C, in the present embodiment, the bolt PG is connected to the cover 120. The bolt PG penetrates into the housing 110 through the through hole VA and is connected to the belt 143. In this way, when the bolt PG disposed on the cover 120 moves relative to the housing 110, the bolt PG drives the belt 143, the belt 143 rotate the rotating shaft 142, and the rotating shaft 142 rotate the threaded shaft 144. Furthermore, as shown in FIGS. 1B and 1C, in the present embodiment, the threaded shaft 144 has a threaded slide rail TR. The first ball 131 and the second ball 132 are connected to each other. The first ball 131 is slidably engaged with the threaded slide rail TR of the threaded shaft 144, and the second ball 132 is slidably engaged with the at least one through track 111. Therefore, when the rotating shaft 142 drives the threaded shaft to rotate, the first ball 131 slides within the threaded slide rail TR and drives the second ball 132 to move along the through track 111, so as to form the specific track on the touch device. Furthermore, the cover 120 and the driving member 141 can recover to the original position through the elastic force of the position-recovery member 150 after the removal of the external force.

Furthermore, the touch device on which the specific track is formed by the electronic seal 100 will recognize whether the specific track matches the default track, and decide whether to provide a certain service for the user. In this way, the electronic seal 100 in the present embodiment will be easily applied for the electrical certification in the public regions and can provide specificity and convenience.

Figure 2A:
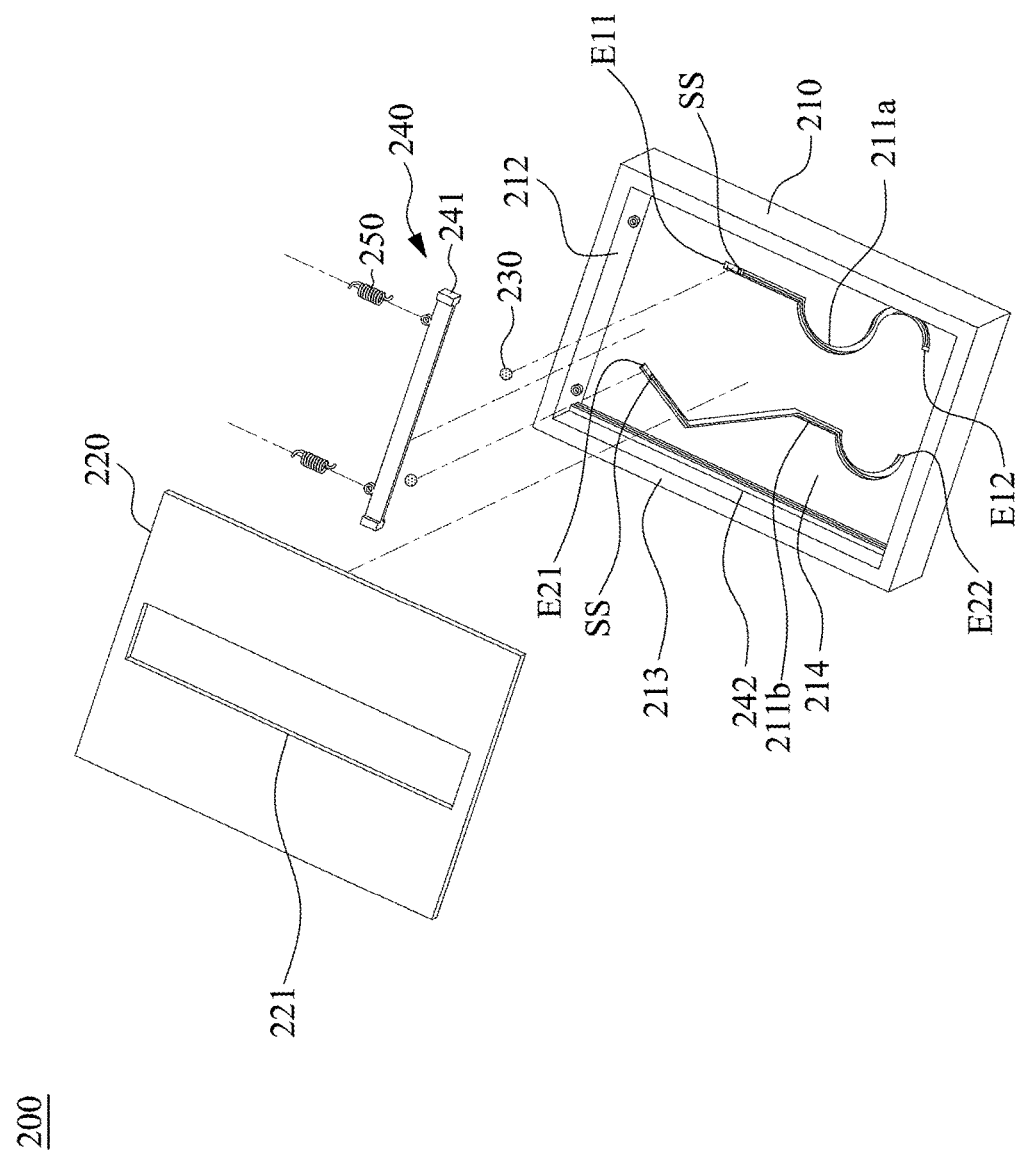
FIG. 2A shows an exploded view of an electronic seal according to another embodiment of the disclosure.

FIG. 2A shows an exploded view of an electronic seal 200 according to another embodiment of the disclosure. FIGS. 2B and 2C show schematic diagrams of the electronic seal 200 in FIG. 2A in different operation steps. As shown in FIG. 2A, in the present embodiment, the electronic seal 200 can also be applied to a touch device, and includes a housing 210, a cover 220, at least one touch piece 230, a transmission mechanism 240, and a position-recovery member 250. Specifically, as shown in FIGS. 2B and 2C, in the present embodiment, the cover 220 is disposed on the housing 210 and covers the housing 210. Specifically, in the present embodiment, the housing 210 includes a first sidewall 212, a second sidewall 213, and a base 214. The second sidewall 213 is connected to the first sidewall 212. The base 214 is located at the bottom of the housing 210 and is connected to the first sidewall 212 and the second sidewall 213. The through tracks 211a and 211b are located on the base 214.

Specifically, as shown in FIGS. 2A and 2C, in the present embodiment, the housing 210 has two through tracks 211a and 211b. These two through tracks 211a and 211b are also located on the bottom of the housing 210, and each has a touch piece 230. In other words, in the present embodiment, the number of the touch pieces 230 which consistent with the number of the through tracks 211a and 211b is also two. Furthermore, in the present embodiment, each touch piece 230 may also contacts the touch device through the corresponding one of the through tracks 211a and 211b. For example, in the present embodiment, the touch pieces 230 may be movably disposed on the through tracks 211a and 211b respectively, and is partially exposed out of the housing 210.

More particularly, as shown in FIGS. 2A and 2C, in the present embodiment, the through track 211a has a first end E11 and a second end E12 opposite to each other, and an engaging structure SS adjacent to the first end E11. The through track 211b has a first end E21 and a second end E22 opposite to each other, and another engaging structure SS adjacent to the first end E21. The engaging structure SS is configured to detachably engage the corresponding touch piece 230 to the first ends E11 and E21. Here, the definition of 'detachably', for example, is that when the touch piece 230 endures external force which is larger than a certain extent, the touch piece 230 can detach from the engaging structure SS and move.

On the other hand, in the present embodiment, the transmission mechanism 240 includes a driving member 241 and a guiding structure 242. The guiding structure 242 is located on the second sidewall 213 of the housing 210. The driving member 241 is slidably engaged onto the guiding structure 242. Furthermore, in the present embodiment, the cover 220 has a groove 221. The groove 221 substantially extends along the direction parallel to the second sidewall 213. The groove 221 is configured such that the external members are allowed to control the movement of the driving member 241 through the groove 221.

For example, in the present embodiment, the source of the external force may be moving the driving member 241 to the positions of the second ends E12 and E22 relative to the first ends E11 and E21 through the cover 220 by hands or external members. Furthermore, in the present embodiment, the touch pieces 230 and the driving member 241 are all magnetic. Specifically, in the present embodiment, the driving member 241, for example, may be a magnetic stripe, and the touch piece 230, for example, may be a magnetic device, but the present disclosure is not limited in this regard. Such, when the driving member 241 accepts the external force to move toward the second ends E12 and E22 relative to the housing 210, the driving member 241 will attract and drive each touch piece 230 to move along the corresponding through track 211, so as to from the specific track on the touch device. For example, in the present embodiment, shortest distances respectively from the first ends E11 and E12 of the through tracks 211a and 211b to the first sidewall 212 are not equal, and the profiles of the through tracks 211a and 211b are not equal, so as to allow the touch pieces 230 to form different specific tracks.

In addition, as shown in FIGS. 2B and 2C, in the present embodiment, the position-recovery member 250 connects to the housing 210 and the driving member 241. Therefore, after the removal of the external force, the driving member 241 may recover to the original position through the elastic force of the position-recovery member 250, and the touch pieces 230 may also recover to the engaging structure SS adjacent to the first ends E11 and E21 through the driving member 241.

In this way, each touch piece 230 may form a specific track on the touch device so as to perform certification. For example, the touch device on which the specific track is formed by the electronic seal 200 can recognize whether the specific track matches the build-in default track, and decide whether to provide specific service for users. In this way, the electronic seal 200 of the present embodiment may be easily applied for electrical certification in public regions and can provide specificity and convenience.

Figure 3A:
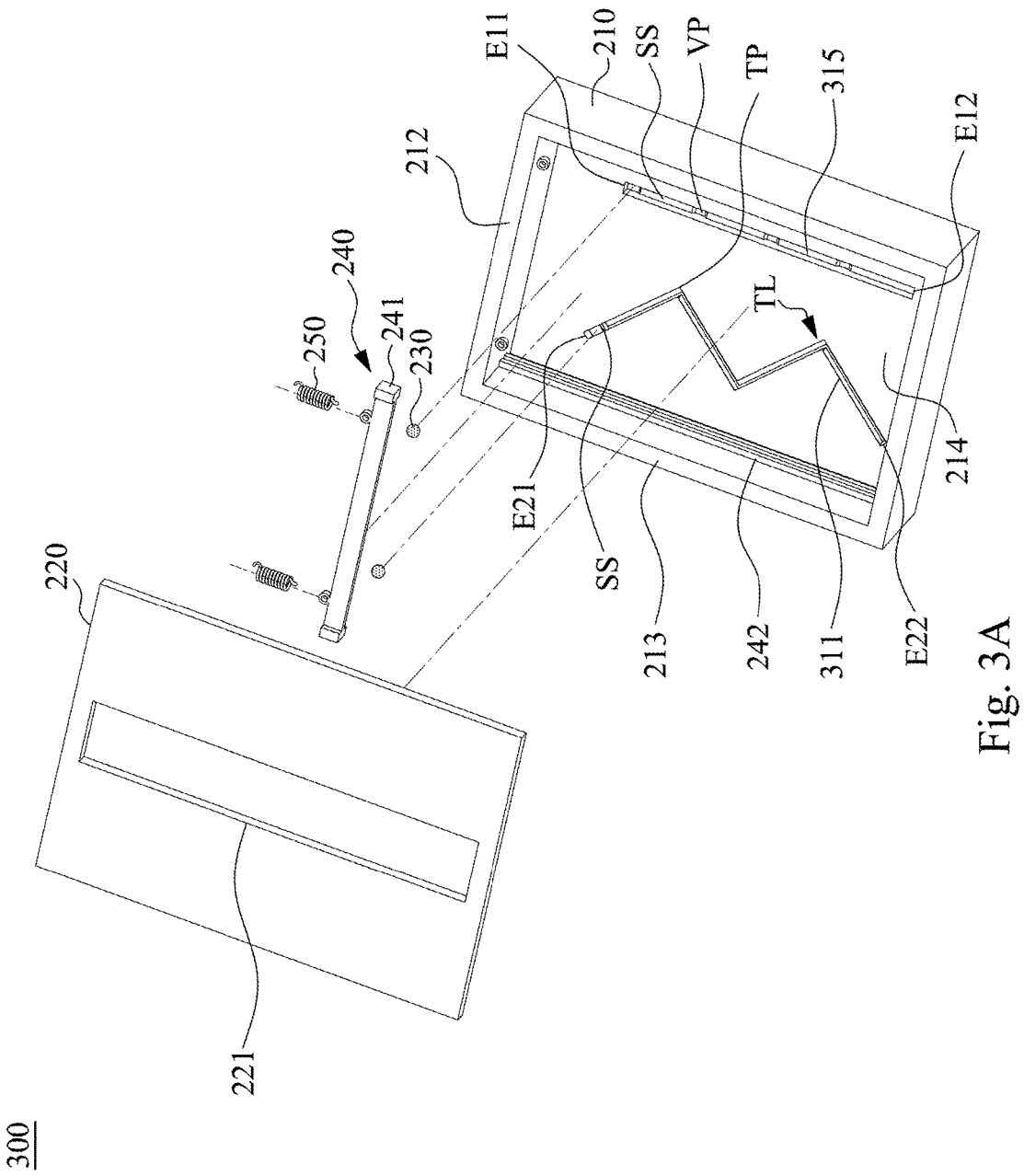
FIG. 3A shows an exploded view of an electronic seal according to another embodiment of the disclosure.
Figures 3B, 3C:
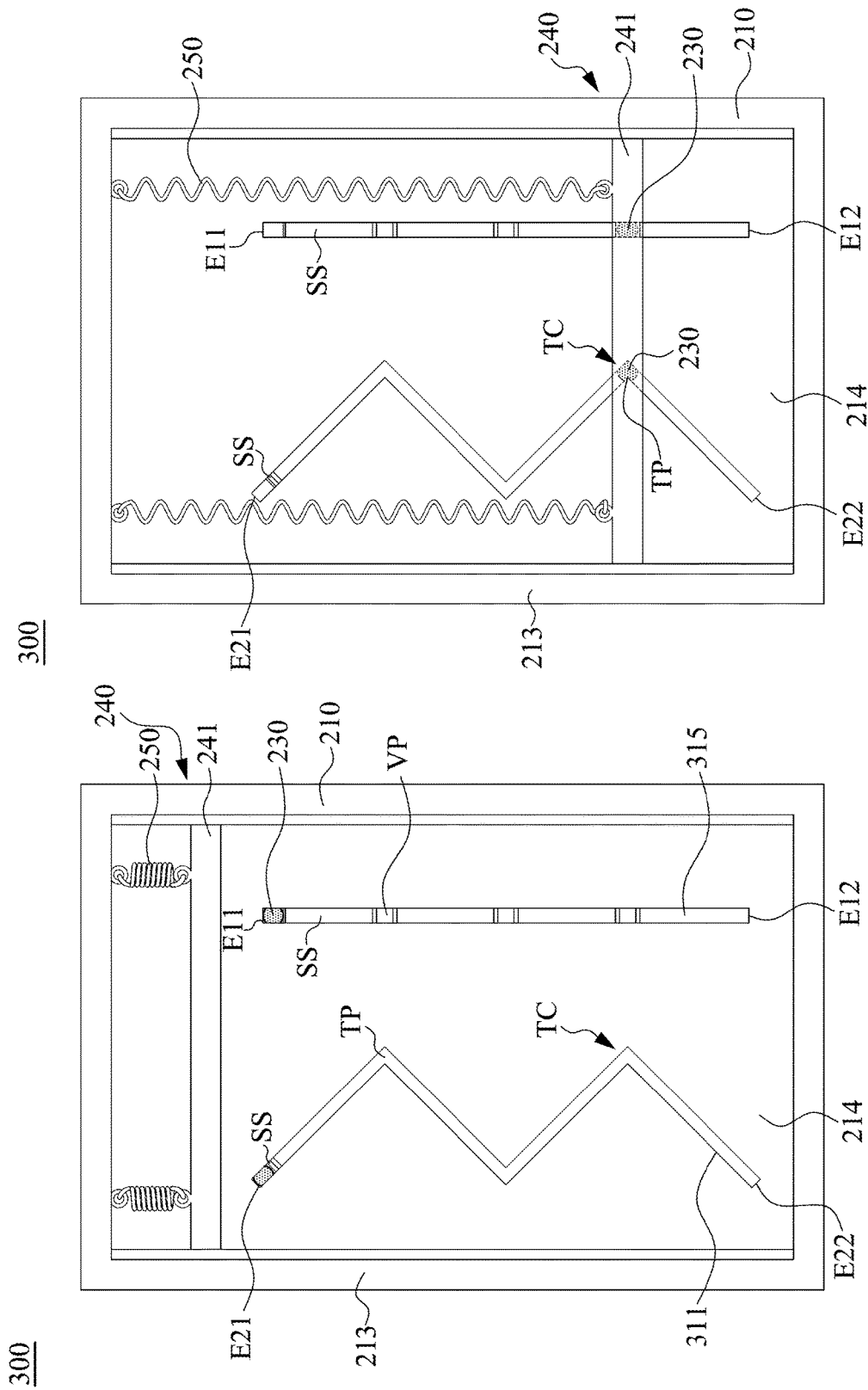
FIGS. 3B to 3D show schematic diagrams of the electronic seal in FIG. 3A in different operation steps.
Figure 3D:
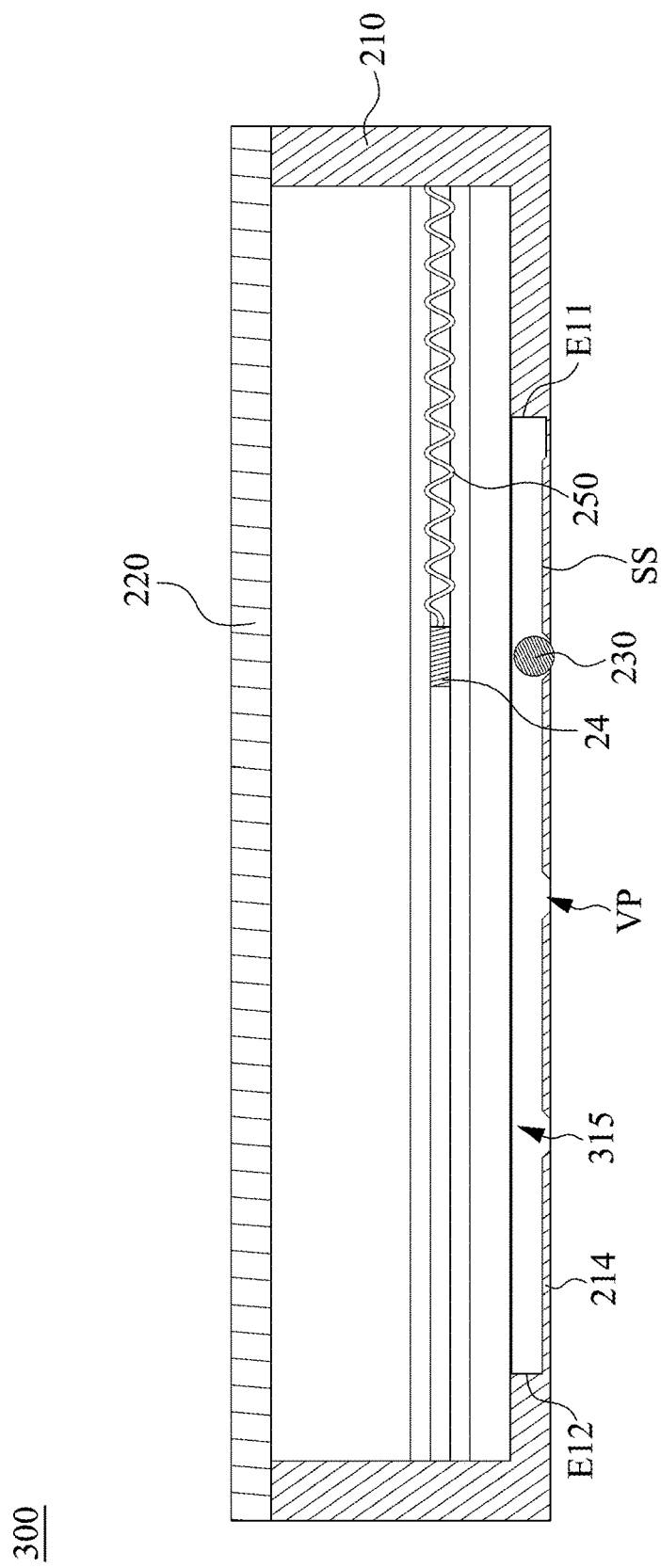

FIG. 3A shows an exploded view of an electronic seal 300 according to another embodiment of the disclosure. FIGS. 3B to 3D show schematic diagrams of the electronic seal 300 in FIG. 3A in different operation steps. Reference is made to FIGS. 3A to 3D, structures of the housing 210, the first sidewall 212, the second sidewall 213, the base 214, the cover 220, the touch piece 230, the transmission mechanism 240, the driving member 241, the guiding structure 242, and the position-recovery member 250 of the electronic seal 300 in FIGS. 3A to 3D are similar to structures of the housing 210, the first sidewall 212, the second sidewall 213, the base 214, the cover 220, the touch piece 230, the transmission mechanism 240, the driving member 241, the guiding structure 242, and the position-recovery member 250 of the electronic seal 200, therefore, reference may be made from the foregoing explanations and will be omitted in the description below. The differences between the electronic seal 300 in the present embodiment and the electronic seal 200 in the embodiments accompanied with FIGS. 2A to 2C will be described below. As shown in FIGS. 3A and 3D, in the present embodiments, the number of the at least one through track 311 of the electronic seal 300 is one, while the through track 311 has a plurality of turning portions TP. Furthermore, the electronic seal 300 further includes one second track 315. The second track 351 has a plurality of through portions VP, and turning portions TP of the turning portions TP of the through track 311 are aligned respectively with the through portions VP of the second track 315.

In this way, as shown in FIGS. 3B to 3D, in the present embodiment, it is also available to make the driving member 241 move to the position of the second ends E12 and E22 relative to the first ends E11 and E21 through the groove 221 of the cover 220 by hands or external members, while make the driving member 241 attract and drive each touch piece 230 to move along the through track 311 and the second track 315, so as to from specific track on the touch device for performing certification.

For example, as shown in FIGS. 3A to 3D, in the present embodiment, since the second track 315 is not completely penetrate through the base 214 but has a plurality of through portions VP, the specific track formed by one of the touch pieces 230 through the second track 315 is spot-shaped track, while the specific track formed by another touch piece 230 through the second track 315 is a continuous track with a plurality of turning points.

Therefore, in the present embodiment, the touch device on which the specific track is formed by the electronic seal 200 can decide whether to provide a specific service for users through not only recognizing whether the specific track matches the build-in default track but also comparing whether the foregoing spot-shaped track matches the plurality of turning points of the continuous track. In this way, the electronic seal 200 of the present embodiment may be easily applied for electrical certification in public regions and can provide specificity and convenience.

Figure 4A:
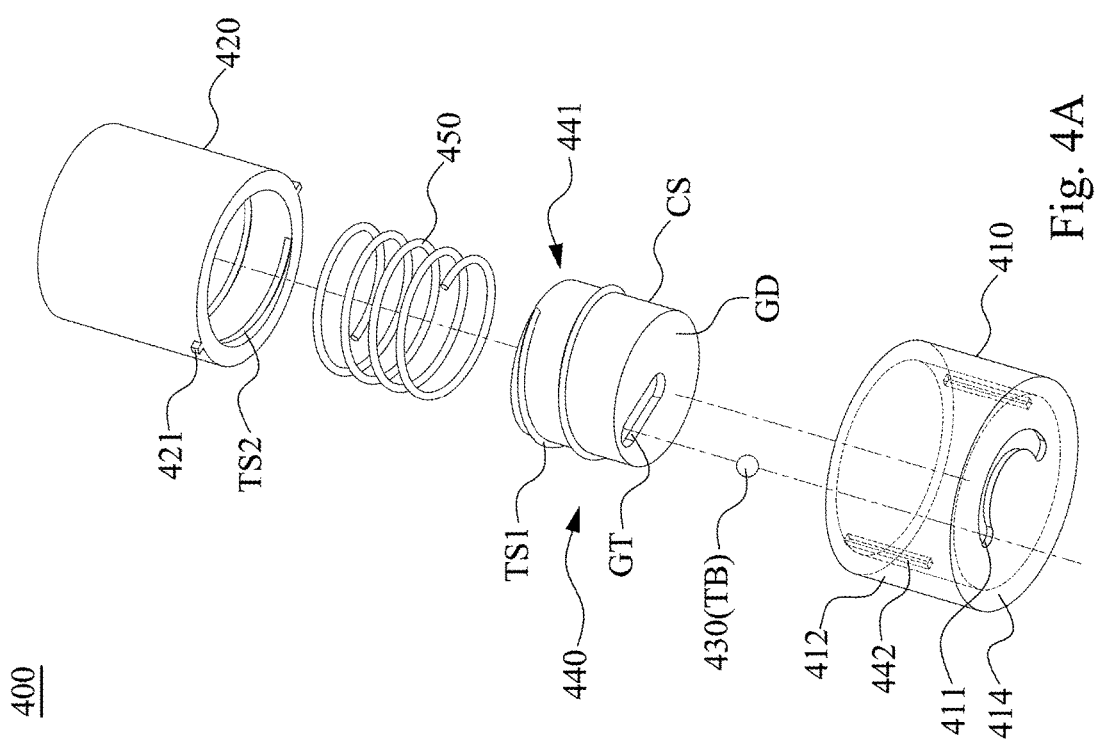
FIG. 4A shows an exploded view of an electronic seal according to another embodiment of the disclosure.
Figure 4F:
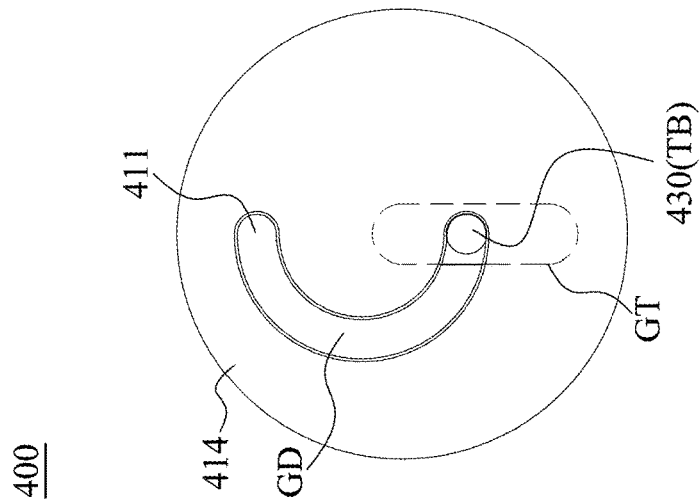
FIGS. 4D to 4F show schematic diagrams of a tracking ball of the electronic seal in FIG. 4A at different locations.
Figure 4E:
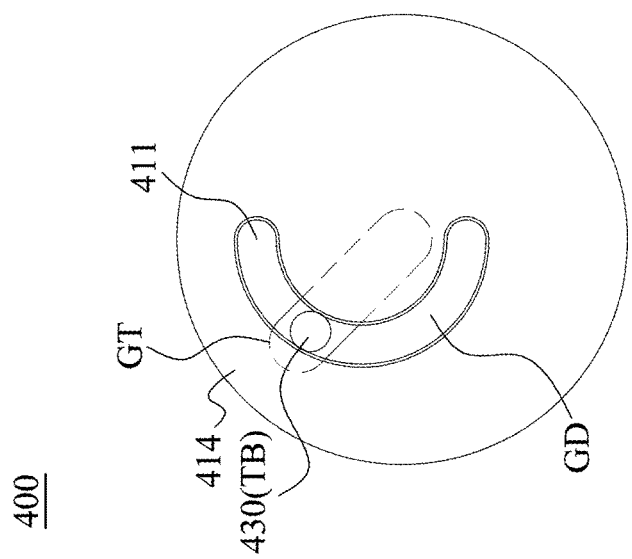
Figure 4D:
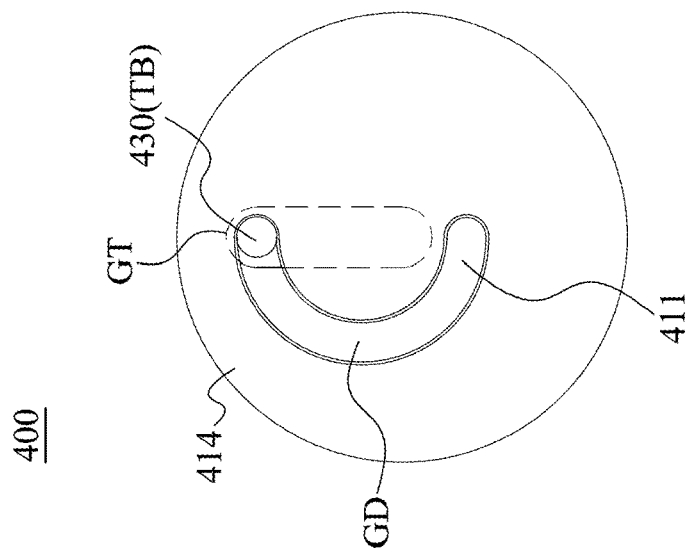

FIG. 4A shows an exploded view of an electronic seal 400 according to another embodiment of the disclosure. FIGS. 4B and 4C show schematic diagrams of the electronic seal 400 in FIG. 4A in different operation steps. FIGS. 4D to 4F show schematic diagrams of a tracking ball TB of the electronic seal 400 in FIG. 4A at different locations. As shown in FIG. 4A, in the present embodiment, the electronic seal 400 can also be applied to a touch device, and includes a housing 410, a cover 420, at least one touch piece 430, a transmission mechanism 440, and a position-recovery member 450.

Specifically, as shown in FIGS. 4A and 4B, in the present embodiment, the housing 410 includes a sidewall 412 and a base 414. The through track 411 is located on the base 414. The cover 420 is movably sleeved onto the housing 410. In the present embodiment, the housing 410 has a through track 411. The through track 411 is located on the base 414 at the bottom of the housing 410.

In addition, as shown in FIGS. 4A and 4B, in the present embodiment, the transmission mechanism 440 includes a driving member 441 and a guiding structure 442. The guiding structure 442 is located on the inner surface of the sidewall 412 of the housing 410. The guiding structure 442 extends toward an end of the sidewall 412 connected to the base 414 and an end of the sidewall 412 away from the base 414. The cover 420 has a bump 421 located on the outer surface of the cover 420. The bump 421 of the cover 420 is slidably engaged to the guiding structure 442. Hereby, the bump 421 is guided to move along the direction in which the guiding structure 442 extends during the period when the cover 420 move toward or away from the housing 410. In the present embodiment, the guiding structure 442, for example, may be a guiding through hole or a guiding rail, but the present disclosure is not limited in this regard.

On the other hand, as shown in FIGS. 4A and 4B, in the present embodiment, the driving member 441 is a cylindrical structure and has a guiding disk GD, a guiding groove GT, and a cylinder outer surface CS. The guiding disk GD abuts against the base 414 of the housing 410. The guiding groove GT is located on the guiding disk GD. The cylinder outer surface CS is connected to the guiding disk GD and has a first threaded structure TS1. Furthermore, as shown in FIG. 4B, in the present embodiment, the cover 420 is sleeved between the housing 410 and the driving member 441. The cover 420 has a second threaded structure TS2 located on the inner surface of the cover 420. As shown in FIG. 4B, in the present embodiment, the second threaded structure TS2 of the cover 420 and the first threaded structure TS1 of the cylinder outer surface CS of the driving member 441 are screwed together, and may be configured to drive the driving member 441.

Furthermore, as shown in FIGS. 4A and 4B, the touch piece 430 is movably disposed on the through track 411 and partially exposed out of the housing 410. The touch piece 430 contacts with the touch device through the through track 411. For example, in the present embodiment, the touch piece 430 includes a tracking ball TB slidably disposed within the through track 411. The tracking ball TB is partially exposed out of the through track 411 and slidably engaged in the guiding groove GT of the driving member 441. When the driving member moves relative to the housing 410, the driving member 441 drives the at least one touch piece 430 to move along the corresponding through track. In this way, each touch piece 430 forms a specific track on the touch device, so as to perform certification.

For example, as shown in FIGS. 4B and 4C, the source of the external force may be from hands or external elements which make the cover 420 to move relative to the position of the cover 420. Hence, the driving member 441, such as the cylindrical structure, accepts external force so as to rotate relative to the housing 410, and the tracking ball TB is pushed by the guiding groove GT to move from one end to another end of the through track 411. In the present embodiment, the profile of the guiding groove GT is strip shaped, and the tracking ball TB forms a specific track on the touch device. For example, as shown in FIGS. 4D and 4F, in the present embodiment, the specific track is arc-shaped, which means the through track 411 is arc-shaped. In other embodiment, the profile of the specific track may be arbitrary shape, which means the through track 411 may be arc-shaped or be arbitrary curve shape. Specifically, the driving member 441 in the present embodiment is cylindrical. The strip-shaped guiding groove GT is disposed at the bottom of the driving member 441 and extends along a radical direction of the bottom. The bottom of the housing 410 is circular. The through track 411 is arc-shaped. The center of the arc of the through track 411 is not overlapped with the center of the bottom of the housing 410. The center of the bottom of the housing 410 is located between two ends of the arc-shaped through track 411. One end of the guiding groove GT is overlapped at the center of the bottom of the housing 410. Furthermore, as shown in FIGS. 4B and 4C, in the present embodiment, the position-recovery member 450 connects to the driving member 441 and the hosing 410. Therefore, the cover 420 and the driving member 441 can recover to the original position through the elastic force of the position-recovery member 450 after the removal of the external force.

In this way, the touch device on which the specific track is formed by the electronic seal 400 can recognize whether the specific track matches the build-in default track, and decide whether to provide a specific service for users. Therefore, the electronic seal 400 of the present embodiment may be easily applied for electrical certification in public regions and can provide specificity and convenience.

As mentioned above, in the embodiment of the present disclosure, when the driving member moves relative to the housing, the electronic seal can drive the touch piece to move along the corresponding through track through the configuration of the touch piece, the driving member and the through track, and forms a specific track on the touch device. In addition, the touch device on which the specific track formed by the electronic seal can recognize whether the specific track matches the build-in default track, and decide whether to provide specific service for users. Therefore, the electronic seal of the present embodiment may be easily applied for electrical certification in public regions and can provide specificity and convenience.

What is claimed is:

1. An electronic seal for a touch device, the electronic seal comprising:
   a housing having at least one through track, wherein the at least one through track is disposed on a bottom of the housing;
   a cover disposed on and covering the housing;
   at least one touch piece movably disposed on the at least one through track and partially exposed out of the housing; and
   a transmission mechanism comprising a driving member, wherein the driving member drives the at least one touch piece to move along the at least one through track when the driving member is actuated relative to the housing.

2. The electronic seal of claim 1, wherein the housing comprises:
   a first sidewall;
   a second sidewall connected to the first sidewall; and
   a base disposed at the bottom of the housing and connected to the first sidewall and the second sidewall, wherein the at least one through track is disposed on the base, and the cover is movably sleeved onto the housing.

3. The electronic seal of claim 2, wherein the first sidewall comprises a through hole, and the transmission mechanism further comprises:
   a rotating shaft rotatably disposed on the second sidewall;
   a belt surrounding and contacting an outer edge of the rotating shaft and configured to drive the rotating shaft to rotate; and
   a threaded shaft connected with the rotating shaft, wherein the driving member of the transmission mechanism comprises a bolt connected to the cover, the bolt penetrates into the housing through the through hole and is connected to the belt, and when the driving member moves relative to the housing, the bolt drives the belt to rotate the rotating shaft, and the rotating shaft rotate the threaded shaft.

4. The electronic seal of claim 3, wherein the threaded shaft having a threaded slide rail, the at least one touch piece comprises a first ball and a second ball, the first ball and the second ball are connected to each other, the first ball is slidably engaged with the threaded slide rail of the threaded shaft, and the second ball is slidably engaged with the through track.

5. The electronic seal of claim 3, wherein the transmission mechanism further comprises a guiding structure located on the second sidewall, and the rotating shaft of the transmission mechanism moves along the guiding structure.

6. The electronic seal of claim 1, further comprising a position-recovery member connected to the housing and the cover.

7. The electronic seal of claim 2, wherein the at least one through track has a first end and an engaging structure adjacent to the first end, wherein the engaging structure is configured to detachably engage the at least one touch piece to the first end.

8. The electronic seal of claim 7, wherein a number of the at least one through track is plural, and shortest distances respectively from the first ends of the through tracks to the first sidewall are not equal.

9. The electronic seal of claim 7, wherein the transmission mechanism further comprises a guiding structure located on the second sidewall, and the driving member is slidably engaged onto the guiding structure.

10. The electronic seal of claim 7, wherein numbers of the at least one touch piece and the at least one through track are plural, the touch pieces and the driving member are magnetic, and the driving member attracts and drives each of the touch pieces to move along a corresponding one of the through tracks when the driving member moves relative to the housing.

11. The electronic seal of claim 7, further comprising a position-recovery member connected to the housing and the driving member.

12. The electronic seal of claim 7, wherein the cover has an opening groove substantially extending along a direction parallel to the second sidewall.

13. The electronic seal of claim 7, wherein a number of the at least one through track is two, and a number of the at least one touch piece is also two.

14. The electronic seal of claim 7, further comprising a second track, the at least one through track having a plurality of turning portions, wherein the second track has a plurality of through portions, and wherein corners of the turning portions of the at least one through track are respectively aligned with the through portions of the second track.

15. The electronic seal of claim 1, wherein the housing comprising:
- a sidewall; and
- a base, wherein the at least one through track is located on the base, and the cover is movably sleeved onto the housing.

16. The electronic seal of claim 15, wherein the transmission mechanism further comprising a guiding structure located on the sidewall of the housing and extending toward two ends of the sidewall; and
- wherein the cover has a bump located on an outer surface of the cover, and the bump of the cover is slidably engaged with the guiding structure.

17. The electronic seal of claim 15, wherein the cover is sleeved between the housing and the driving member, and the driving member is a cylindrical structure and comprises:
- a guiding disk abutting against the base of the housing;
- a guiding groove located on the guiding disk; and
- a cylindrical outer surface connected to the guiding disk and having a first threaded structure.

18. The electronic seal of claim 17, wherein the cover has a second threaded structure located on an inner surface of the cover, and the second threaded structure and the first threaded structure of the cylindrical outer surface of the driving member are screwed together.

19. The electronic seal of claim 17, wherein the at least one touch piece comprises a tracking ball slidably disposed in the at least one through track, the tracking ball is partially protruded out of the at least one through track and is slidably engaged to the guiding groove of the driving member; and the guiding groove pushes the tracking ball to move from an end to another end of the at least one through track when the driving member rotates relative to the housing.

20. The electronic seal of claim 15, further comprising a position-recovery member connected to the driving member and the cover.

21. The electronic seal of claim 15, wherein a profile of the guiding groove is strip-shaped, and the tracking ball forms a specific track on the touch device.

22. The electronic seal of claim 21, wherein a profile of the specific track is arc-shaped.

* * * * *